United States Patent

[11] 3,586,189

[72] Inventor Harold Tornheim
 430 N. Auburn Ave., Sierra Madre, Calif. 91024
[21] Appl. No. 847,237
[22] Filed Aug. 4, 1969
[45] Patented June 22, 1971
 Continuation-in-part of application Ser. No. 749,358, Aug. 1, 1968.

[54] APPARATUS FOR DEMOUNTING AN ATTACHMENT FROM A TRUCK
15 Claims, 6 Drawing Figs.
[52] U.S. Cl. .................................................. 214/515, 254/47
[51] Int. Cl. ................................................. B60p 1/64
[50] Field of Search .................................... 214/515, 517, 512; 254/47, 48, 45; 215/505

[56] References Cited
UNITED STATES PATENTS
2,021,952 11/1935 Wren ............................ 214/517

Primary Examiner—Albert J. Makay
Attorney—Christie, Parker and Hale

ABSTRACT: An inclinable pickup truck carriage together with a pair of demountable posts at the rear of the truck and a corresponding pair of tension lines can demount an attachment such as a camper from the truck. Each tension line runs from a point on the attachment, then over a sheave at the top of its post, and on to a point on the chassis. Between the sheave and the chassis, the tension line passes around pulleys located alternately on the side of the carriage and on the side of the chassis. The attachment can thus easily demount after the inclination of the carriage from a horizontal position, parallel to the truck chassis, into an inclined position, and after the insertion of supports between the attachment and the ground.

APPARATUS FOR DEMOUNTING AN ATTACHMENT FROM A TRUCK

CROSS REFERENCE TO RELATED APPLICATION

This application is a continuation-in-part of application Ser. No. 749,358, filed Aug. 1, 1968.

BACKGROUND OF THE INVENTION

This invention relates to a truck having an inclinable carriage, and more particularly concerns an apparatus for demounting an attachment such as a camper from the truck.

A pickup truck is a versatile vehicle, which numerous commercial organizations as well as private individuals employ. It can transport miscellaneous objects of freight that fit the truck carriage and are within the truck's load capacity. A serious obstacle to the full exploitation of the truck's versatility is the difficulty of loading and unloading heavy objects.

A camper truck, which is a truck carrying a camper, is of increasing appeal to private individuals. A camper truck combines a means for both transportation and accommodation, thereby greatly reducing the expense of a family vacation or similar trip. At present, however, pickup trucks carrying campers lack expediency in demounting the camper. Such demounting usually requires repetitiously screwing up a few turns of several jacks successively so as to approximate the simultaneous raising of all of the jacks. As a result, a camper truck ordinarily carries only the camper and does not carry other attachments.

SUMMARY OF THE INVENTION

This invention provides a truck having an inclinable carriage and apparatus for respectively mounting and demounting an attachment, such as a camper, to and from the truck.

The apparatus of this invention cooperating with the inclinable carriage is actually a symmetrical pair of apparatus, one apparatus on each side of the truck. Each apparatus includes a tension line, connected at one end to the rear end of the attachment, then passing over the top of a sheave stationed on the truck above its point of connection to the attachment, and then secured at the other end to the truck chassis. Between the sheave and the chassis, the tension line passes around pulleys situated alternately in the side of the chassis and in the side of the carriage. Inclining the carriage causes the tension line to "shorten" between the sheave and the connection to the attachment, and this "shortening" lifts the rear end of the attachment. Supports, inserted at this time between the attachment and the ground, assume the weight of the attachment as the carriage returns to its horizontal position. After the attachment and the truck are free of each other, the final process is driving the truck out from under the attachment.

Preferably, the sheave is at the top of a vertical support member, such as a removable post stationed at the rear end of the truck, either on the carriage or on the chassis. Alternatively, the support member can be a sidewall mounted on the carriage. In a further alternative form of the invention, the sheave can be at the rear end of the truck, either on the carriage or on the chassis, with the tension line connected to a vertical attachment member, such as a post, extending downward from the side of the attachment.

An attachment to the truck is one of a variety of attachments, each modifying the truck into a somewhat different kind of truck or aiding in a different way the loading or the transportation of freight. For example, in the preferred form of the invention the attachment is a camper. However, an attachment also can be a supporting structure for an overhead rack, a dump-truck body, or a variety of other structures capable of use with a single pickup truck having an inclinable carriage. The construction of the truck of this application can also be such as to accommodate simultaneously the invention of copending application Ser. No. 749,358, filed Aug. 1, 1968, regarding a tailgate lift. The inclinable carriage, the removal posts, and the tension lines are already present.

The invention of this application alone gives a pickup truck having an inclinable carriage the increased freedom of performing readily as a pickup truck as well as a camper truck. The capability of accommodating a variety of attachments, together with use of the tailgate lift of the copending application, makes the truck a remarkably versatile vehicle.

BRIEF DESCRIPTION OF THE DRAWINGS

The features of the specific embodiments of the best mode contemplated of carrying out the invention are illustrated in the drawings, in which.

DETAILED DESCRIPTION OF THE SPECIFIC EMBODIMENTS

Figure 1:
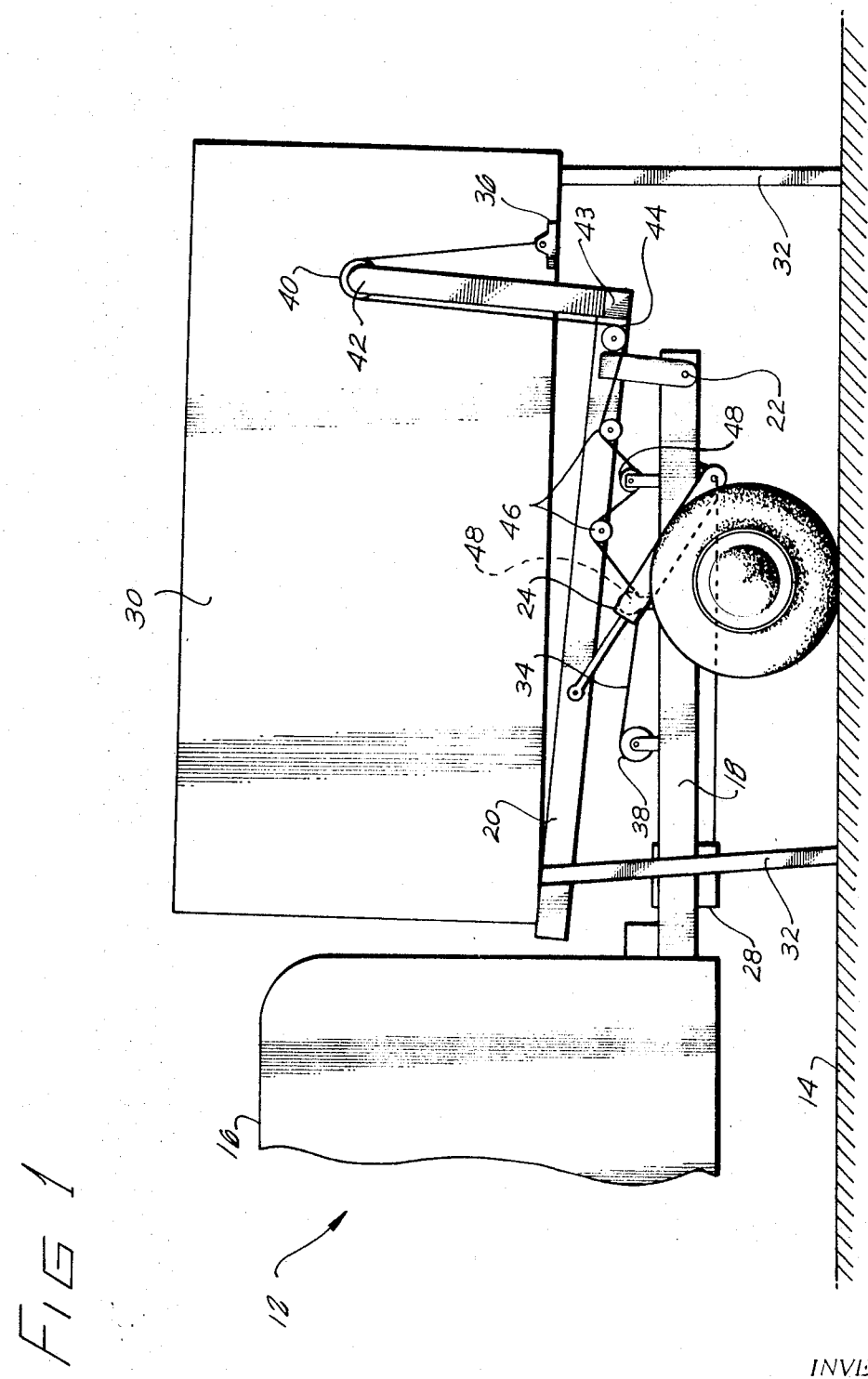
FIG. 1 shows a truck with an inclinable carriage having the apparatus of this invention, and an attachment, which may be a camper, in a transitional position between a mounted and demounted position.

FIG. 1 shows a truck 12 parked on the ground 14. The truck has a driver's cab 16 at its front end and a chassis 18 extending from the cab toward the rear end of the truck. A carriage 20 is inclinable between a horizontal position and an inclined position about a pivot pin 22 in both its rear and the rear of the chassis 18. The carriage contemplated by this invention is preferably an inclinable framework comprising a pair of longitudinal beams connected at their rear by a transverse beam. The carriage can also be an inclinable bed, with or without sidewalls. A hydraulic cylinder 24 is the agent that inclines the carriage. Hydraulic lines 26 from a power unit 28, such as an electric motor driven pump, energize the hydraulic cylinder. Alternatively, a mechanical actuator (not shown), such as a screw drive, may replace the hydraulic cylinder.

The carriage 20 supports an attachment 30, which may be a camper. As discussed previously, the attachment may take the form of a supporting structure for an overhead rack, or a dump truck body, for example. FIG. 1 shows a pair of upright supports or posts 32 interposed between the bottom of the attachment and the ground. The posts 32 as well as the carriage 20 support the attachment 30 when the truck is in a transitional position between a mounted and a demounted position, as shown in FIG. 1. The posts 32 can be permanently secured to the four corners of the attachment such that they can be lowered into supporting position during demounting of the attachment.

The apparatus cooperating with the inclinable carriage 20 is actually a symmetrical pair of apparatus, one apparatus on each side of the truck. The drawings show only one side. A tension line 34 (one of a pair) extends from an eyebolt plate 36, in the rear of the attachment, forward to an adjusting means 38 mounted on the chassis. There is just one adjusting means, which brings together for interaction the ends of the two tension lines. Copending application Serial No. 749,358, filed Aug. 1, 1968, regarding the tailgate lift, fully describes the adjusting means.

The tension line passes around a plurality of pulleys on its way from the eyebolt plate 36 to the adjusting means 38. The order of the pulleys, starting from the eyebolt plate, is as follows:

a. a sheave 40 mounted on top of an upright support member or post 42 removably set in socket 43 in the rear corner of the carriage 20;

b. a first guide pulley 44 at the rear end of the carriage adjacent to the post;

c. carriage guide pulleys 46 arranged serially along the side of the carriage; and d. chassis guide pulleys 48 arranged serially along the side of the chassis 18.

The tension line alternates in a weaving manner between the carriage guide pulleys and the chassis guide pulleys. The adjusting means 38 equalizes the tension between the two tension lines, serves as an anchor point for the front end of the lines, and takes up the slack in the tension lines whenever they are not under load.

The sequence below gives the list of steps for demounting the attachment from the truck. At first, the attachment rests secured to the horizontal carriage, and the supports 32 are absent.

STEP 1. Remove fastening means (not shown) between the attachment 30 and the carriage 20, so that the attachment rests on the carriage by means of gravity alone;

STEP 2. Insert posts 42 into their sockets 43 in the rear of the truck, then pass the tension lines over the sheaves 40, and connect them to the eyebolt plates 36. Before this step, the adjusting means 38 had reeled in the slack, and the end of the tension line was at the first guide pulley 44;

STEP 3. Incline the carriage 20 from its horizontal position. During this step, the carriage guide pulleys 46 draw away from the chassis guide pulleys 48. Consequently, a greater length of tension line is necessary to span the distances. Since the total length of the tension line is fixed and since the adjusting means 38 acts as an anchor point, the distance between the eyebolt plate 36 and the sheave 40 must shorten. This shortening raises the rear end of the attachment 30 clear of the carriage. The carriage 20 itself raises the front end of the attachment;

STEP 4. Insert the supports 32 between the attachment 30 and the ground. The supports may be integral with the attachment, and they lower for this step, or they may be horses or jacks (not shown) brought to the truck. The supports do not yet support the attachment;

STEP 5. Return the carriage 20 to its horizontal position, so that the attachment 30 rests entirely on the supports 32. In this state, the adjusting means 38 provides the only tension on the tension lines in taking up slack;

STEP 6. Disconnect the tension lines from the eyebolt plates 36. The truck and attachment 30 are now apart;

STEP 7. Unreeve the tension lines from the sheaves 40, and remove the posts 42 from their sockets 43; and STEP 8. Drive the truck out from under the attachment.

Mounting the attachment 30 onto the truck is essentially the reverse of these steps.

Because of the compression of the truck's suspension springs (not shown) between the chassis 18 and the wheels of the truck, the carriage 20 is closer to the ground when the carriage is carrying the attachment 30 than when the carriage is empty. In the fifth step above, the carriage's returning to its horizontal position, the carriage rises as the weight of the attachment transfers to the supports 32 and as the suspension springs consequently relax. Therefore, in the third step, the carriage must incline enough so that it is possible to rest the entire weight on the supports in the fifth step.

Figure 2:
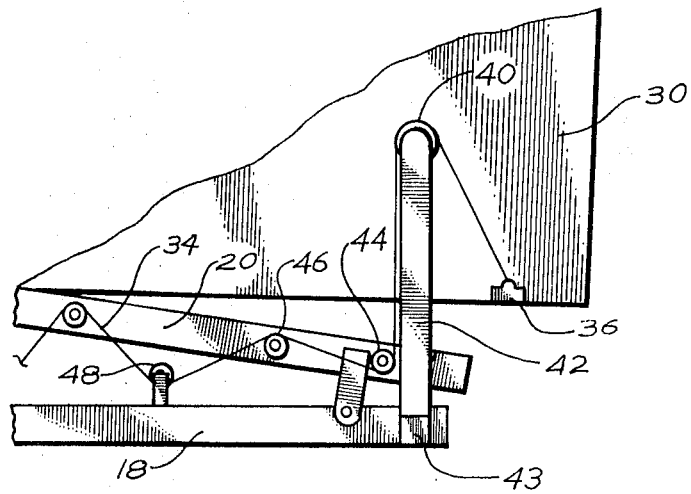
FIG. 2 shows an alternate form of the apparatus shown in FIG. 1.

There are several alternative embodiments of the invention due to modifications regarding the locations of the sheave 40 and the tension line's connection to the attachment 30. FIGS. 1 and 2 show the sheave on a rather tall post 42 in order to demonstrate that a common post can serve both this application and the copending application for the tailgate lift, Ser. No. 749,358, filed Aug. 1, 1968. A short post is also satisfactory so long as it is tall enough to meet the requirements of STEP 3 in the demounting procedure above.

The demounting procedure above applies especially to a design wherein the post 42 is inside the attachment 30. If the post is outside the attachment, either behind or alongside the attachment, the tension line can remain attached to the eyebolt plate 36 while the attachment is in its mounted position. If the post is outside and alongside the attachment, as FIG. 1 shows, it may be possible to leave the tension line reeved over the sheave 40 and to leave the post in its socket 43 at all times.

FIG. 1 also shows the sheave 40 on the post 42 in the rear corner of the carriage 20. This location is another demonstration of possible common parts in the truck of this invention and that shown in the copending application for the tailgate lift, Ser. No. 749,358, filed Aug. 1, 1968. FIG. 2 shows that the location for the post can be in the rear corner of the chassis 18 instead of the carriage.

Figure 3:
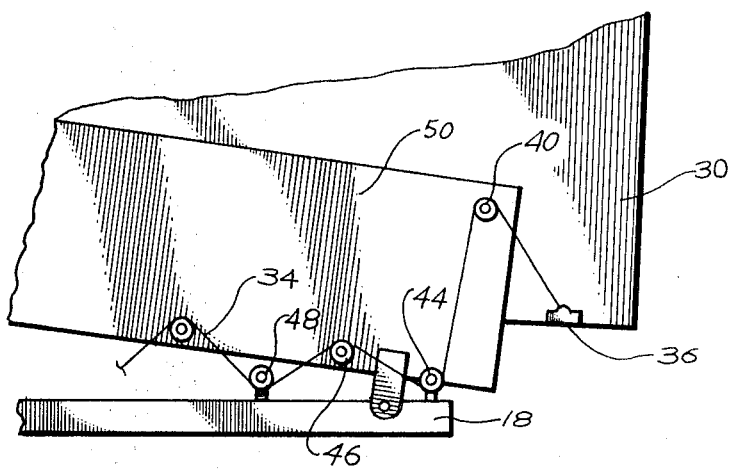
FIG. 3 shows an alternate form of the apparatus of this invention wherein the truck has sidewalls.

FIG. 3 shows an alternative embodiment wherein the truck has sidewalls 50. In this form of the invention, the post 42 in unnecessary since the sheave 40 may be on the sidewall at its rear end below the upper edge. FIG. 3 shows the sidewall mounted on the carriage, obviating the post 42 shown in FIG. 1. Likewise, the sidewall can be mounted on the chassis, obviating the post 42 shown in FIG. 2. In this embodiment, the attachment clears the sheave during demounting, so that there are no steps in the procedure for the insertion and the removal of the post and the reeving and unreeving of the tension line. The first guide pulley 44 is shown on the chassis 18 instead of on the sidewall 50. The guide pulley 44 can be mounted on the sidewall if desired, however.

Figure 4:
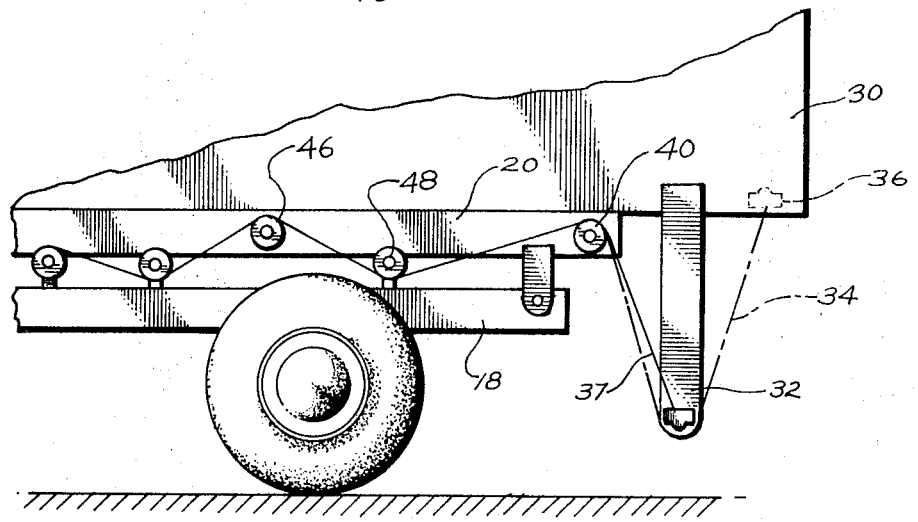
FIG. 4 shows an alternate form of the apparatus of this invention using alternative means for securing the tension line to the attachment.
Figure 5:
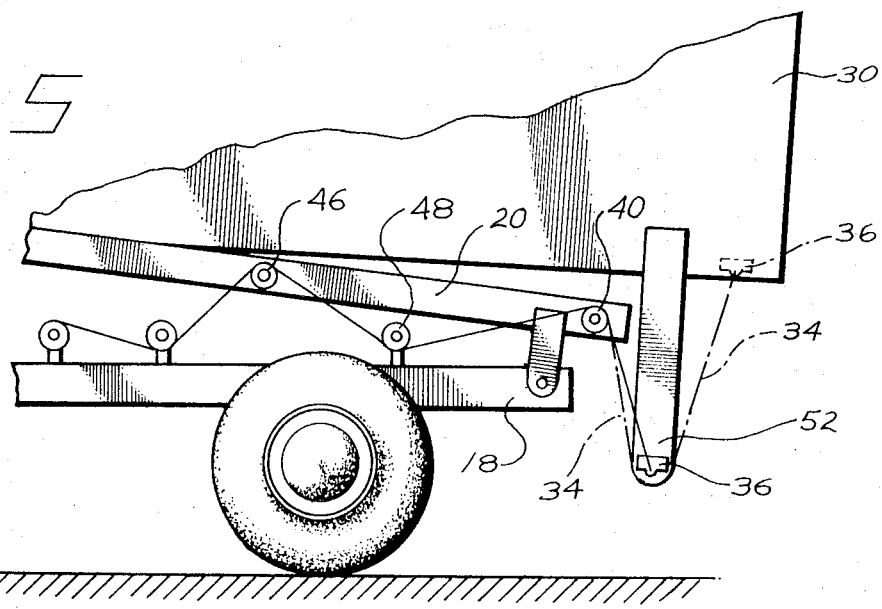
FIG. 5 shows the apparatus of FIG. 4 in a transitional position between a mounted and a demounted position.
Figure 6:
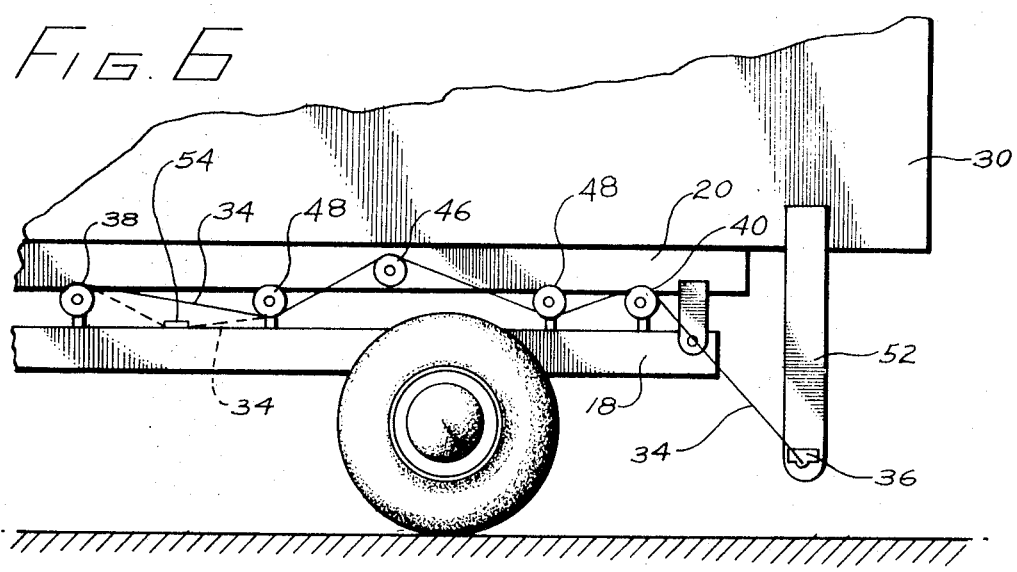
FIG. 6 shows an alternate form of the apparatus shown in FIG. 4.

In another alternative embodiment shown in FIGS. 4, 5, and 6, an upright attachment member 52 is in the rear of the attachment 30 pointing downward. The sheave 40 is on the rear of the truck, either on the carriage 20, as shown in FIGS. 4 and 5, or on the chassis, as shown in FIG. 6. The sheave is so near to the first guide pulley 44 that the sheave may replace the pulley. The tension line passes over the top of the sheave and then downward toward the point of connection to the attachment, just as it does in the other embodiments, and connects to the eyebolt plate 36 located on the bottom of the attachment member 52. An alternative location for the eyebolt plate is on the bottom of the attachment behind the attachment member, as shown by the phantom lines in FIGS. 4 and 5, so that the tension line connects to the eyebolt plate after passing through a groove or a sheave (not shown) in the bottom of the attachment member. In this embodiment, the attachment also clears the sheave during demounting, so that there are no steps in the demounting procedure for the insertion and the removal of the attachment member and the reeving and unreeving of the tension line.

The drawings show arrangements of the carriage and chassis pulleys capable of maintaining the attachment during demounting in a well-levelled position. The improved truck with a tailgate lift of application Ser. No. 749,358, filed Aug. 1, 1968, with only a single pair of chassis guide pulleys and of carriage guide pulleys, can handle an attachment such as a camper in accordance with this application, but the demounted attachment slopes slightly downward toward its rear. This state of conditions might be acceptable to some individuals. The pulleys in the application for the tailgate lift have the same locations as the pulleys in this application, so that the same truck can serve both applications, but this application has an additional pair of carriage guide pulleys and of chassis guide pulleys so located as to maintain the attachment well-levelled.

Another design (not shown) also using only one pair of carriage and of chassis guide pulleys can maintain the demounted attachment well-levelled if the pulleys are closer to the front end of the carriage and chassis.

An attachment, such as a camper, may have a high center of gravity, an asymmetric center of gravity or a short line of contact on the carriage at the front of the camper. These are conditions conducive to toppling the attachment or to wedging it against the truck's sidewalls if they are present. The state of equal tension between the pair of tension lines, which is a characteristic of the adjusting means 38, further aggravates conditions for toppling or wedging. A disabling means for the tension-equalizing function of the adjusting means reduces the tendency to topple or to wedge. One such disabling means is a single clamp 54 secured to the chassis for clamping one of the tension lines, as shown by the phantom lines in FIG. 6. It is usually best to activate the disabling means only whenever the attachment manifests a tendency to topple or to wedge.

It is recognized that various means for mounting the sheave 40 to the truck above the tension line's point of connection to an attachment can be used, and that the truck of this invention can be adapted to accommodate a variety of attachments, without departing from the scope of the invention.

I claim:

1. In a truck having a chassis, a carriage pivotally mounted on the chassis, an attachment to the truck mounted on the carriage, and means for inclining the carriage between a horizontal position parallel to the chassis and an inclined position, an apparatus for demounting the attachment from the carriage, the apparatus comprising:
   a. a right and a left sheave disposed on the right and left side, respectively, of the truck;
   b. a right and a left carriage guide pulley on the right and left side, respectively, of the carriage forward of the carriage's pivot;
   c. a right and a left chassis guide pulley on the right and the left side, respectively, of the chassis forward of the carriage's pivot;
   d. a right tension line reeved successively over the right sheave, the right carriage guide pulley, and the right chassis guide pulley, and being connected at its rear end to the attachment at a point below the right sheave and at its forward end to the chassis; and
   e. a left tension line reeved successively over the left sheave, the left carriage guide pulley, and the left chassis guide pulley, and being connected at its rear end to the attachment at a point below the left sheave and at its forward end to the chassis; whereby inclining of the carriage effects lifting of the attachment at its front end by the carriage itself and at its rear end by a consequent shortening of the right and the left tension lines between their points of connection to the attachment and the corresponding sheaves so as to allow the attachment to be shifted between a position on the carriage and a position on supports interposed between the attachment and the ground.

2. The improved truck of claim 1 wherein the sheaves are on right and left support members disposed on the right and the left side, respectively, of the carriage.

3. The improved truck of claim 2 wherein the support members comprise removable posts.

4. The improved truck of claim 2 wherein the pair of support members comprises rear parts of a pair of sidewalls mounted on the carriage.

5. The improved truck of claim 1 wherein the sheaves are on right and left support members disposed on the right and the left side, respectively, of the chassis.

6. The improved truck of claim 5 wherein the support members comprise removable posts.

7. The improved truck of claim 5 wherein the pair of support members comprises rear parts of a pair of sidewalls mounted on the chassis.

8. The improved truck of claim 1 including a right and a left attachment member extending downward from the right and the left side, respectively, of the attachment; and wherein the sheaves are on the chassis, and wherein the tension lines extend to the bottoms of the attachment members.

9. The improved truck of claim 1 including a right and a left attachment member extending downward from the right and the left side, respectively, of the attachment; and wherein the sheaves are on the carriage, and wherein the tension lines extend to the bottoms of the attachment members.

10. The improved truck of claim 1 wherein each side of the carriage has two guide pulleys and each side of the chassis has two guide pulleys, the pulleys being serially arranged along the carriage and the chassis; and wherein the tension line on each side passes around each guide pulley on that side, alternating between the carriage and the chassis guide pulleys.

11. The improved truck of claim 1 wherein hooks secure the rear ends of the tension lines to the attachment.

12. The improved truck of claim 1 wherein the attachment comprises a camper.

13. The improved truck of claim 1 wherein the ends of the tension lines running to the chassis are connected to adjusting means secured to the chassis.

14. The improved truck of claim 13 including disabling means cooperating with the adjusting means for clamping one of the tension lines.

15. The improved truck of claim 1 including a least three vertical support members permanently secured to the attachment such that they can be lowered into supporting position during demounting of the attachment.